US011930901B2

(12) United States Patent
Espartero

(10) Patent No.: US 11,930,901 B2
(45) Date of Patent: Mar. 19, 2024

(54) COMPACT UTILITY WALLET

(71) Applicant: Nestor Espartero, Newberry, FL (US)

(72) Inventor: Nestor Espartero, Newberry, FL (US)

( * ) Notice: Subject to any disclaimer, the term of this patent is extended or adjusted under 35 U.S.C. 154(b) by 94 days.

(21) Appl. No.: 17/575,820

(22) Filed: Jan. 14, 2022

(65) Prior Publication Data

US 2023/0284758 A1 Sep. 14, 2023

(51) Int. Cl.

| | |
|---|---|
| ***A45C 1/06*** | (2006.01) |
| ***A45C 11/18*** | (2006.01) |
| ***A45C 13/02*** | (2006.01) |
| ***B26B 11/00*** | (2006.01) |

(52) U.S. Cl.

CPC .............. *A45C 1/06* (2013.01); *A45C 11/182* (2013.01); *A45C 13/023* (2013.01); *B26B 11/00* (2013.01); *A45C 2001/062* (2013.01); *A45C 2001/065* (2013.01); *A45C 2001/067* (2013.01); *A45C 2011/186* (2013.01)

(58) Field of Classification Search

CPC ... A45C 11/182; A45C 2011/186; A45C 1/06; A45C 2001/062; A45C 2001/065; A45C 2001/067; A45C 13/023

See application file for complete search history.

(56) References Cited

U.S. PATENT DOCUMENTS

| | | | | |
|---|---|---|---|---|
| 3,461,469 | A * | 8/1969 | Morrision | B26B 11/00 7/152 |
| 9,125,464 | B2 | 9/2015 | Minn et al. | |
| 10,327,525 | B2 | 6/2019 | Deng | |
| 10,791,808 | B2 * | 10/2020 | Kane | A45C 1/08 |
| 2009/0199940 | A1 | 8/2009 | Toner | |
| 2010/0147710 | A1 * | 6/2010 | Lebauer | A45D 29/20 206/320 |
| 2015/0059936 | A1 | 3/2015 | Singer | |
| 2015/0083289 | A1 * | 3/2015 | Johnson | A45C 1/06 150/144 |
| 2018/0064223 | A1 | 3/2018 | Singer | |
| 2019/0375087 | A1 * | 12/2019 | Liang | B26B 11/001 |
| 2019/0380458 | A1 | 12/2019 | Muldowney, Jr. | |
| 2020/0337426 | A1 | 10/2020 | Huang et al. | |

* cited by examiner

*Primary Examiner* — Sue A Weaver

(74) *Attorney, Agent, or Firm* — Lewellyn Law, PLLC; Stephen Lewellyn

(57) ABSTRACT

The present invention is a compact utility wallet design to hold card-like contents and keys and tool accessories. First and second rigid plates are interposed to sandwich card-like contents there between. At least one encircling elastic band is interposed with the at least two rigid plates along longitudinal extents thereof to bias them inwardly and securely hold the card-like contents while providing elastic volume there between for adding or removing contents. At least three bosses are peripherally arranged toward sides of the first rigid plate on a surface facing opposite of the second rigid plate and configured to rotatable mount keys or tools. A third rigid plate is removably attached to the first rigid plate by threaded fasteners, one threaded fastener received by each boss. A first cover plate is removably attached to the third rigid plate and a second cover plate is removably attached the second rigid plate.

18 Claims, 5 Drawing Sheets

COMPACT UTILITY WALLET

FIELD OF THE INVENTION

The present disclosure relates to wallets and, more particularly, to wallets for credit cards and keys and tool accessories.

BACKGROUND OF THE INVENTION

Conventional wallets and key holders are inherently bulky, uncomfortable, and unsightly. There have been many attempts to improve wallets and key holders. For example, U.S. Pat. No. 10,791,808 describes a compact wallet and US Published Patent Application Number 20180064223 describes a key holder, both disclosures of which are incorporated herein by reference. While these devices, as well as others seek to improve upon wallets and key holders, a need remains for an improved wallet and key holder construction.

SUMMARY OF THE INVENTION

Embodiments described herein provide for compact utility wallet that has a low profile with a footprint about the size of a standard credit card and is configured to removably hold card-like contents and hold keys and/or various accessory tools.

It is an object of the invention to provide a compact utility wallet that is RFID shielding.

It is an object of the invention to provide a compact utility wallet that is easy to operate.

It is another object of the invention provide a compact utility wallet that can be configurated with various tool accessories.

In one aspect, a compact utility wallet is provided that has first and second rigid plate interposed to sandwich card-like contents there between. At least one encircling elastic band is interposed with the at least two rigid plates along longitudinal extents thereof to bias them inwardly and securely hold the card-like contents while providing elastic volume there between for adding or removing contents. At least three bosses are peripherally arranged toward sides of the first rigid plate on a surface facing opposite of the second rigid plate and configured to rotatable mount keys or tools. A third rigid plate is removably attached to the first rigid plate by threaded fasteners, one threaded fastener received by each boss. A first cover plate is removably attached to the third rigid plate and a second cover plate is removably attached the second rigid plate.

Numerous additional objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature or a feature with similar functionality. In the drawings.

DETAILED DESCRIPTION

Figure 2:
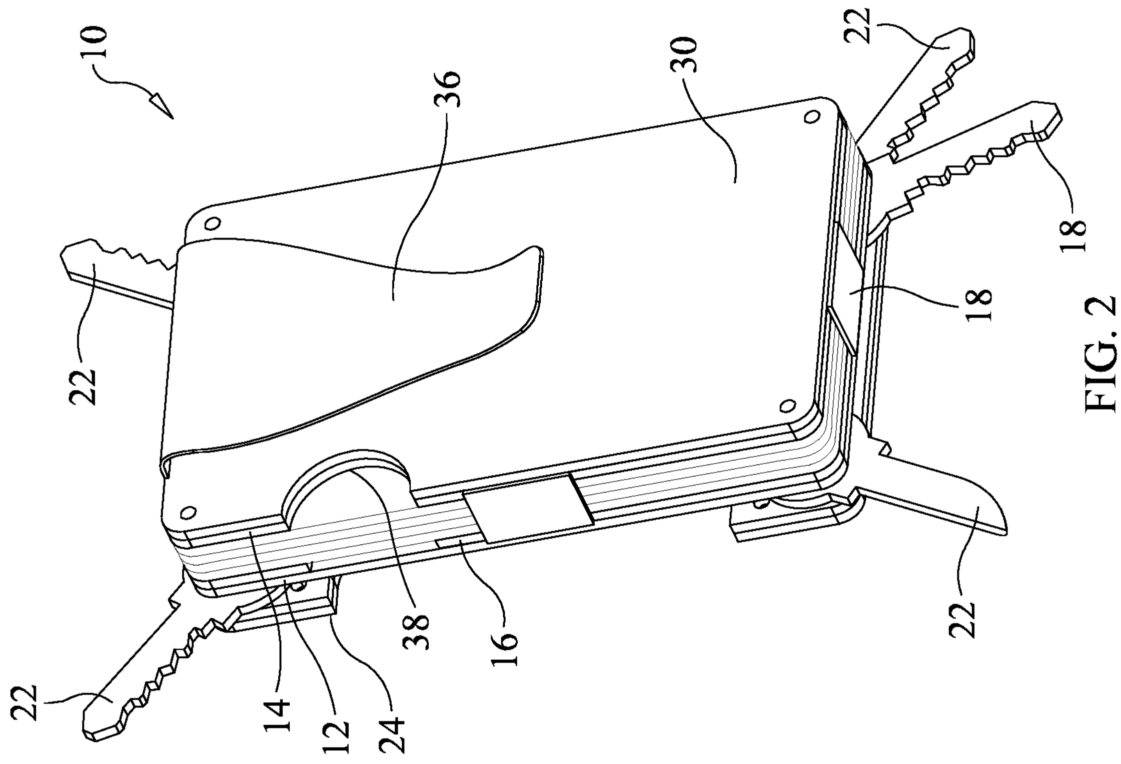
FIG. 2 is a second side perspective view of a compact utility wallet constructed in accordance with an embodiment of the invention.
Figure 1:
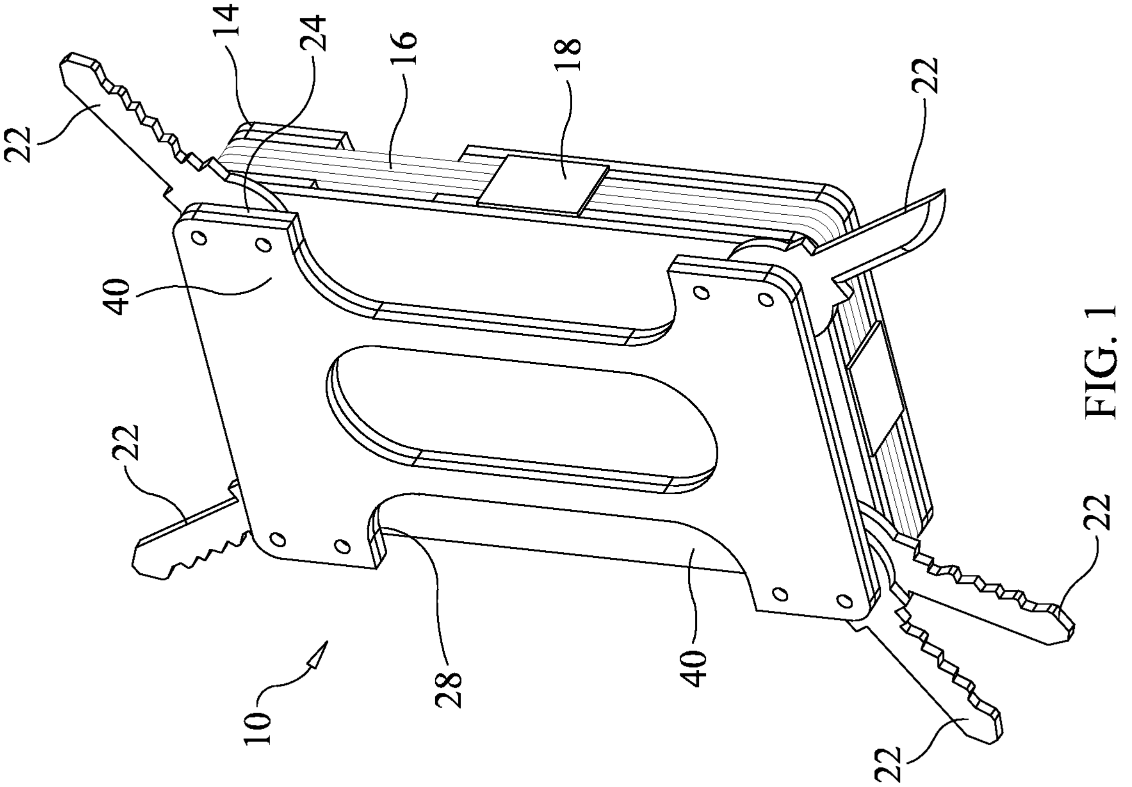
FIG. 1 is first side perspective view of a compact utility wallet constructed in accordance with an embodiment of the invention.
Figure 3:
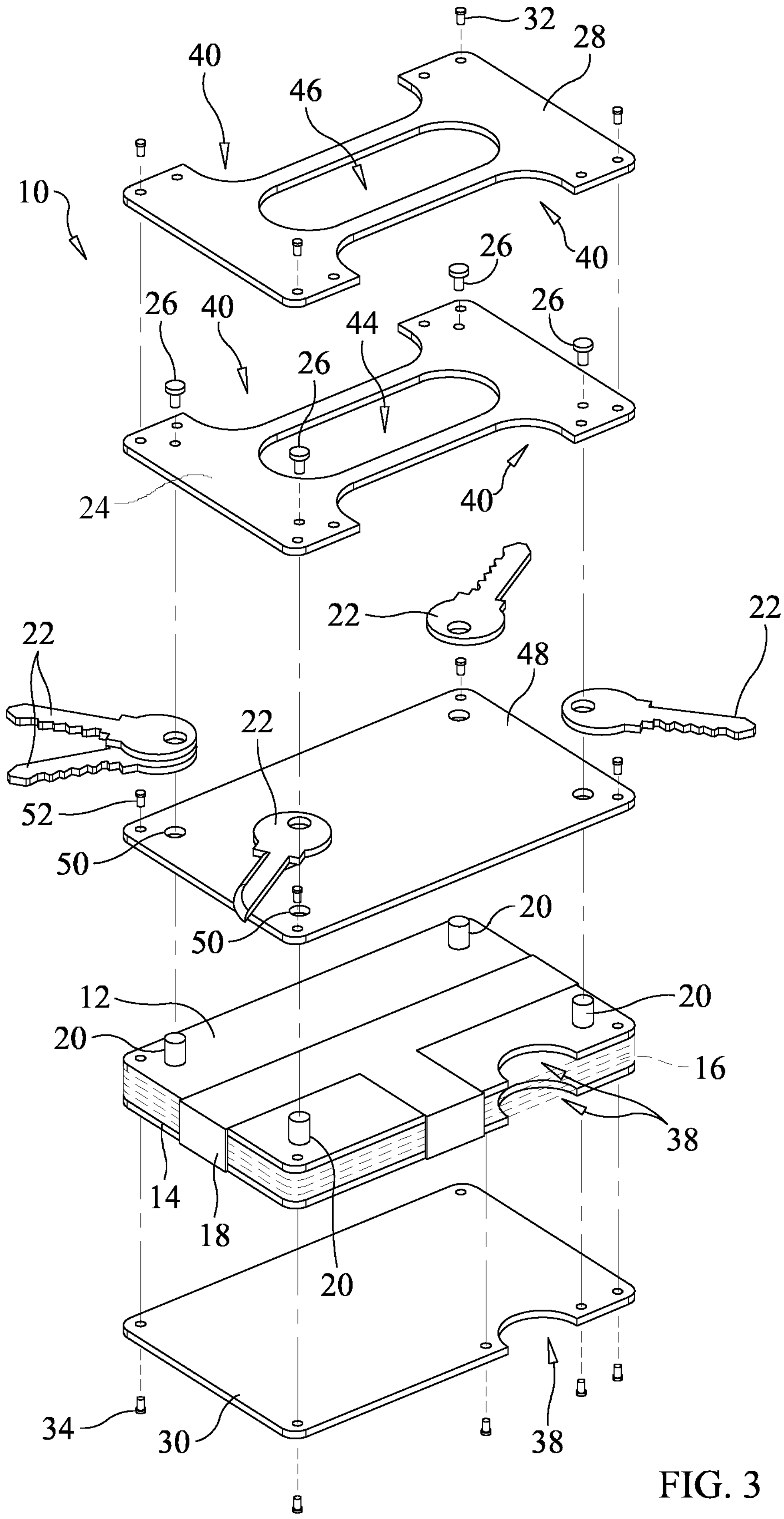
FIG. 3 is an exploded view of a compact utility wallet constructed in accordance with an embodiment of the invention.
Figure 4:
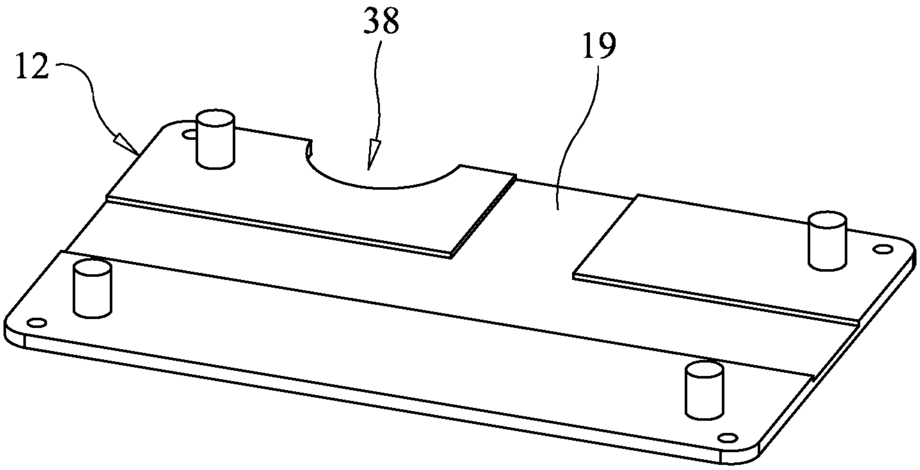
FIG. 4 is a perspective view of a first rigid plate of the compact utility wallet.

Referring to FIGS. 1-6, a compact utility wallet 10 has as a first rigid plate 12 and a second rigid plate 14 disposed to provide a space for receiving and holding card-like contents 16 therebetween. The rigid plates 12 and 14 are bound by at least one encircling elastic band 18. The encircling elastic band 18 holds the card-like contents 16 securely by means of compression, while also expanding elastically to open space between the rigid plates 12 and 14. The elastic band 18 is positioned in recess 19 provided in rigid plate 12 and recess 21 provided in plate 14. The added volume of the space provides capacity for additional contents. The rigid plates 12 and 14 are sized to the dimensions of a standard credit card and the resulting perimeter defines a profile.

The compact utility wallet 10 further includes a plurality of bosses 20 peripherally arranged toward sides of the first rigid plate 12 on a surface facing opposite of the second rigid plate 14 and configured to rotatable mount keys or tools 22 to the wallet. A third rigid plate 24 is removably attached to the first rigid plate 12 by threaded fasteners 26, one threaded fastener received by each boss 20, thereby disposing the third rigid plate at a spaced distance from the first rigid plate to provide a space therebetween to accommodate the keys and tools therebetween. To this end, the keys or tools 20 can be rotated about a respective boss 20 between a stowed positioned wherein the keys or tools 20 are substantially located between the first and third plates 12 and 24, and an in-use position wherein the keys or tools extend beyond the peripheral of the wallet 10.

Wallet 10 further has a first cover plate 28 and a second cover plate 30. The first cover plate 28 is attached to the third rigid plate 24 by screws 32. The second cover plate 30 is attached to the second rigid plate by screws 34. A third cover plate 48 is attached to first plate 12 to cover and protect the band 18 from key movement. Cover plate 48 has a plurality of holes 50 one for each post 20 to pass through to allow its direct attachment to rigid plate 12 with the posts extending through the holes 50. The cover plate 48 is attached by screws 52 to the rigid plate 12.

Key access openings 44 and 46 are provided in plates 24 and 28, respectively. The openings 44 and 46 are cooperatively aligned when the plates are secured to each other to allow finger access to the keys that attached to the wallet and sandwiched between plates 24 and 12.

A clip 36 can be attached to either the second rigid plate 14 or third rigid plate 24. Clip 36 can be made of spring-steel or the like resilient material and can be used to secure paper money or other articles to the wallet 10.

A plurality of finger notches can be made in the various rigid plates to allow a user to use his or her finger to expose the card-like contents 16 and to access the keys or tools 22. Particularly, aligned card-like contents finger notches 38 through proximal ends of the first and second rigid plates and the second cover plate to expose an edge of the card-like contents for the purpose of pushing the edge to elevate the contents into view through distal ends of the rigid plates. Aligned accessory access finger notches 40 through proximal ends of the third rigid plate and the first cover plate, including the finger notch 38 through the first rigid plate, to expose a key or tool for the purpose of pushing the key or tool to rotate the key or tool in to an in-use position.

Figure 5:
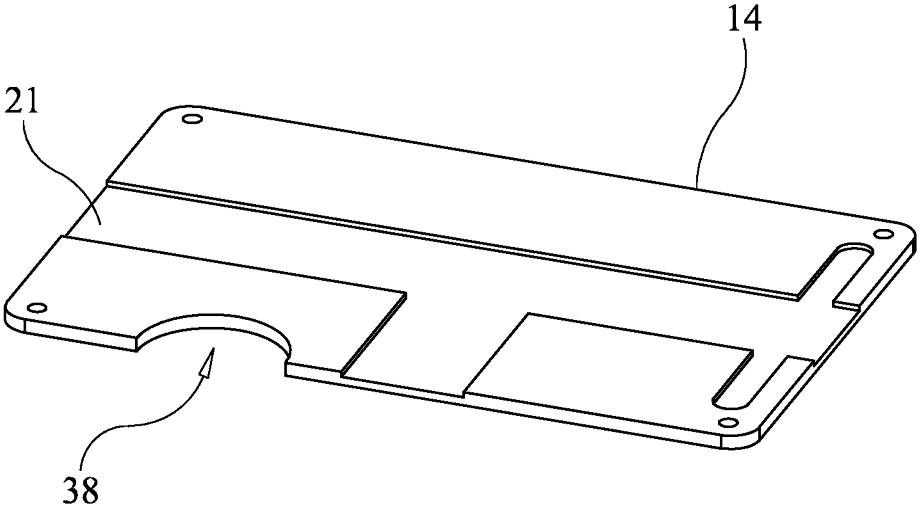
FIG. 5 is a perspective view of a second rigid plate of the compact utility wallet.

With further refence to FIG. 5, bosses 20 can be configured so that more than one key or tool 22 can be rotatably mounted thereto. As shown here, the boss 20 has a length sufficient to support the thickness of two keys or tools 22 thereon and to provide a sufficient spacing between the first and third rigid plates to allow the keys or tools to rotate therebetween. A spacer 42 can be placed between each key and tool 22 to provide space therebetween to allow rotation of either tool respective to the other.

The card-like contents include, but are not limited to, credit cards, a driver's license, ID cards, business cards, affiliation/membership cards, currency bills, loyalty cards, coupons, a calendar, receipts or any paper or card-stock item of a personal or business nature. The rigid plates 12, 14, and 24 are either comprised of metal, or otherwise integrate a metalized surface, for radio-frequency identification (RFID) theft protection purposes, as credit cards are increasingly using RFID chips.

Figure 6:
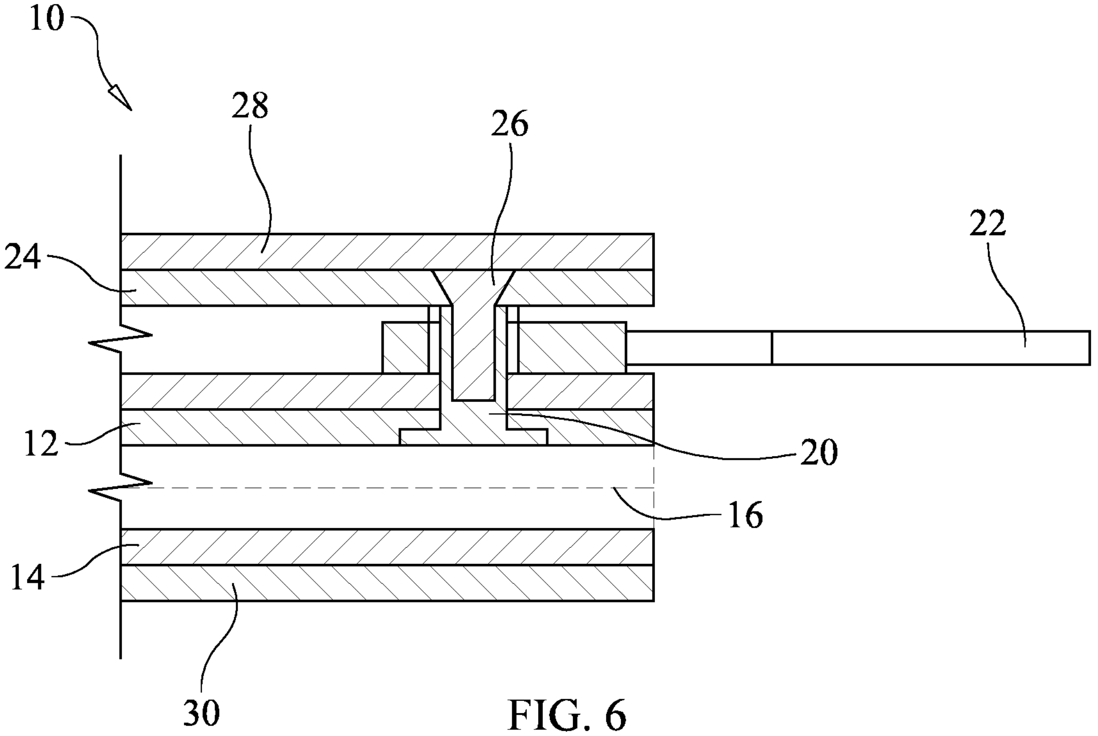
FIG. 6 is a cross-sectional view through a compact utility wallet constructed in accordance with an embodiment of the invention.
Figure 7:
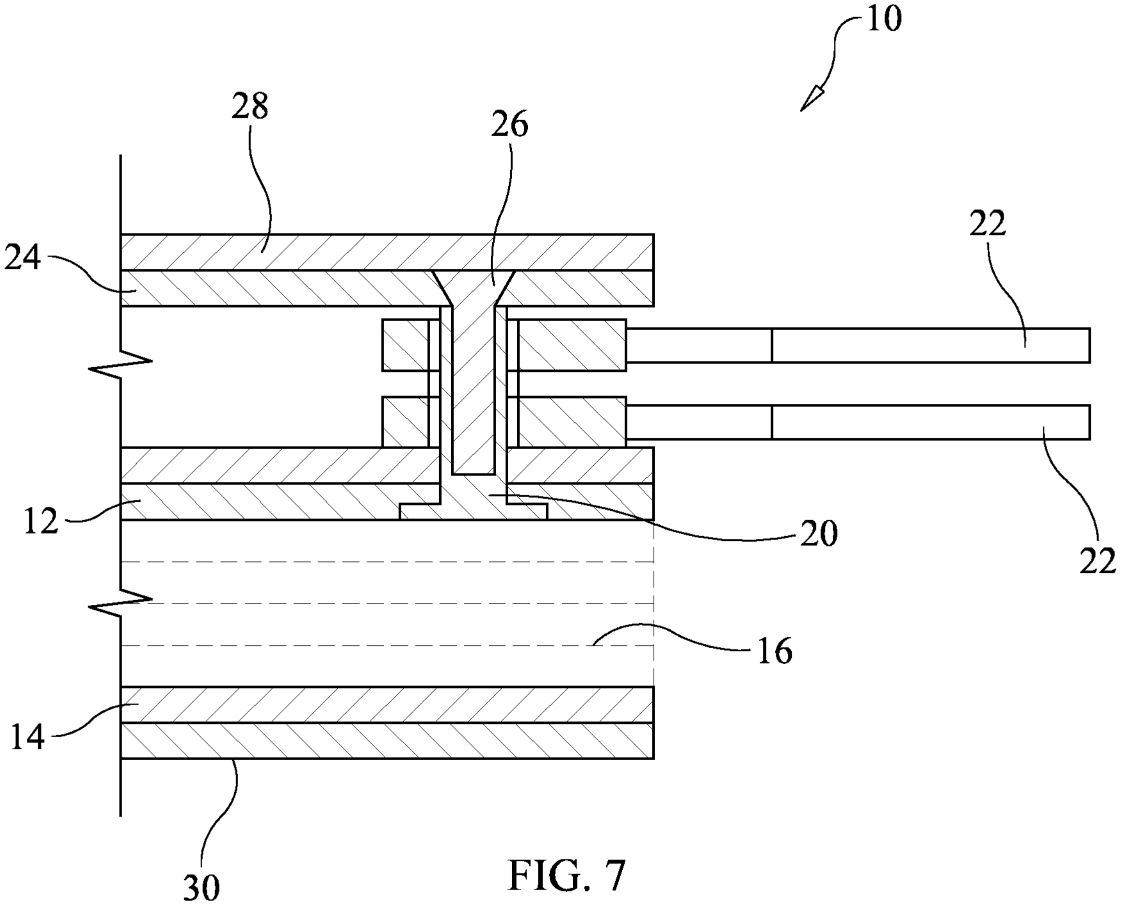
FIG. 7 is a cross-sectional view through a compact utility wallet constructed in accordance with an embodiment of the invention, showing an alternative arrangement.
Figure 8:
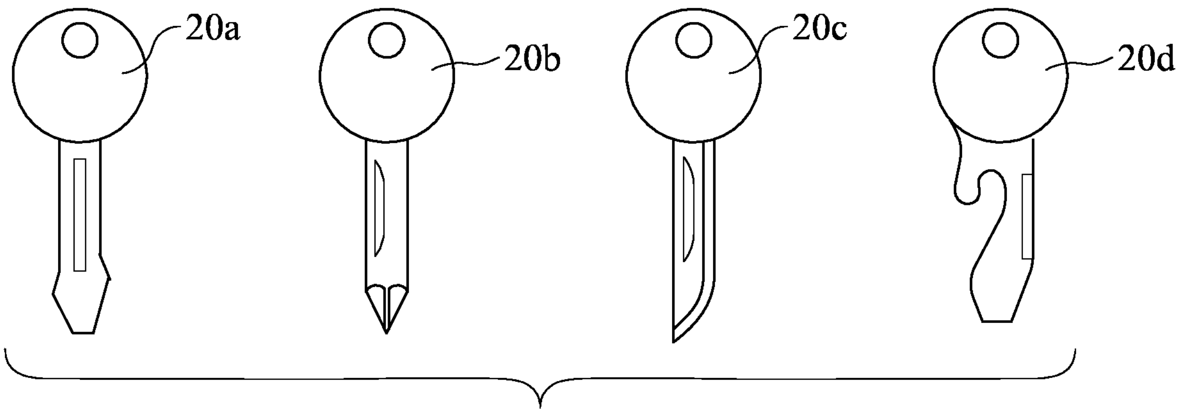
FIG. 8 is a diagrammatic view of various tool accessories.
Figure 9:
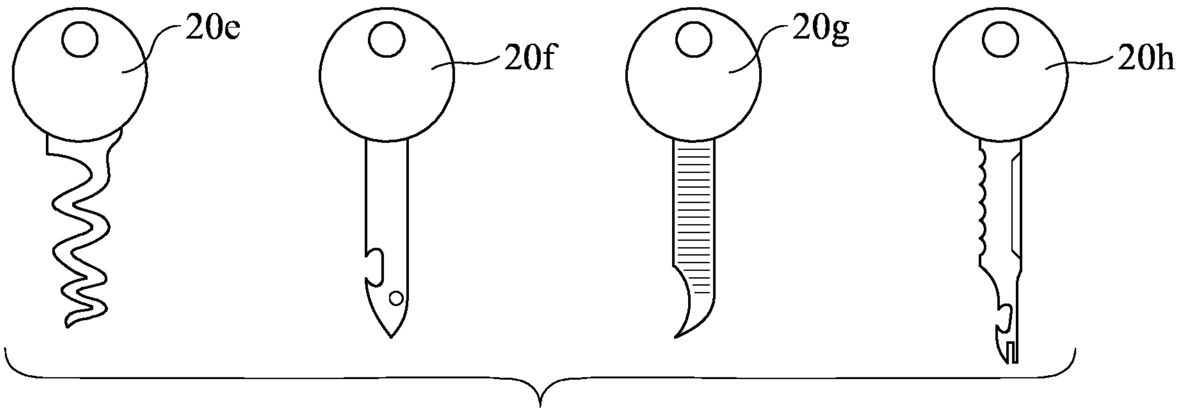
FIG. 9 is a diagrammatic view of various tool accessories.
Figure 10:
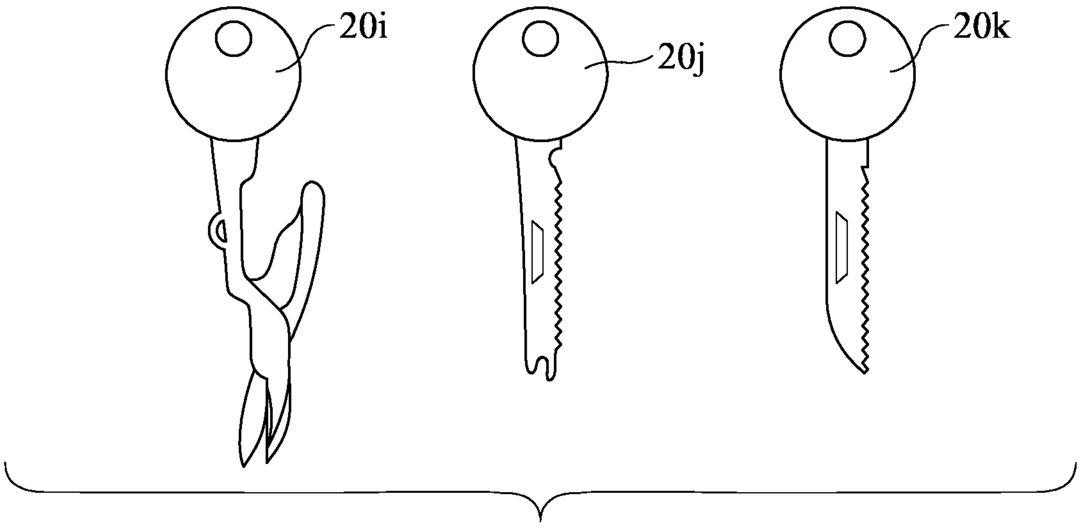
FIG. 10 is a diagrammatic view of various tool accessories.

With reference to FIG. 6, representatively tools 20 can have many different configurations and uses. For example, a tool may comprise flathead screwdriver 20*a*, a phillips-head screwdriver 20*b*, a knife 20*c*, and a bottle opener with screwdriver 20*d*. As further depicted in FIG. 7, a tool 20 may comprise a corkscrew 22*e*, a needle 22*f*, a file 22*g*, and a fishhook remover 22*h*. As further examples, in FIG. 8, tool 20 may comprise a pair of scissors 22*i*, a serrated blade 22*j*, or a saw 22*k*. It is important to note that the tools are not limited to just those shown here, the tools could be provided with many different configurations and uses.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A compact utility wallet, comprising:

first and second rigid plates interposed to sandwich card-like contents there between;

at least one encircling elastic band interposed with the first and second rigid plates along longitudinal extents thereof to bias them inwardly and securely hold the card-like contents while providing elastic volume there between for adding or removing contents;

at least three bosses peripherally arranged toward sides of the first rigid plate on a surface facing opposite of the second rigid plate and configured to rotatable mount keys or tools;

a third rigid plate removably attached to the first rigid plate by threaded fasteners, one threaded fastener received by each boss, the third rigid plate having a first key access opening formed therethrough and at a center thereof;

a first cover plate removably attached to the third rigid plate by screws, the first cover plate having a second key access opening formed therethrough and at a center thereof, the first key access opening and the second key access opening being cooperatively aligned;

a second cover plate removably attached the second rigid plate by screws; and a third cover plate having a plurality of holes one for each of the at least three bosses to pass through, the third cover plate attached to the first rigid plate by screws with the at least one encircling elastic band disposed between the third cover plate and the first rigid plate.

2. The compact utility wallet of claim 1, wherein at least the first and second rigid plate is comprised of metal for RFID protection.

3. The compact utility wallet of claim 1, wherein at least the first and second rigid plate is metalized for RFID protection.

4. The compact utility wallet of claim 1, further comprising:

aligned card-like contents finger notches through proximal ends of the first and second rigid plates to expose an edge of the card-like contents for the purpose of pushing the edge to elevate the contents into view through distal ends of the rigid plates.

5. The compact utility wallet of claim 1, further comprising:

aligned accessory access finger notches through proximal ends of the first and third rigid plates to expose a key or tool for the purpose of pushing the key or tool to rotate the key or tool in to an in-use position.

6. The compact utility wallet of claim 1, further comprising:

a clip removably attached to at least one of the second and third rigid plates.

7. A compact utility wallet, comprising:

first and second rigid plates interposed to sandwich card-like contents there between;

at least one encircling elastic band interposed with the first and second rigid plates along longitudinal extents thereof to bias them inwardly and securely hold the card-like contents while providing elastic volume there between for adding or removing contents;

at least three bosses peripherally arranged toward sides of the first rigid plate on a surface facing opposite of the second rigid plate and configured to rotatable mount keys or tools;

a third rigid plate removably attached to the first rigid plate by threaded fasteners, one threaded fastener received by each boss, the third rigid plate having a first key access opening formed therethrough and at a center thereof;

a first cover plate removably attached to the third rigid plate by screws, the first cover plate having a second key access opening formed therethrough and at a center thereof, the first key access opening and the second key access opening being cooperatively aligned;

a second cover plate removably attached the second rigid plate by screws;

a third cover plate having a plurality of holes one for each of the at least three bosses to pass through, the third cover plate attached to the first rigid plate to cover by screws with the at least one encircling elastic band disposed between the third cover plate and the first rigid plate;

aligned card-like contents finger notches through proximal ends of the first and second rigid plates to expose an edge of the card-like contents for the purpose of pushing the edge to elevate the contents into view through distal ends of the rigid plates;

aligned accessory access finger notches through proximal ends of the first and third rigid plates to expose a key or tool for the purpose of pushing the key or tool to rotate the key or tool about a respective boss to which the key or tool is rotatably mounted in to an in-use position; and a clip removably attached to at least one of the second and third rigid plates.

8. The compact utility wallet of claim 7, wherein at least the first and second rigid plate is comprised of metal for RFID protection.

9. The compact utility wallet of claim 7, wherein at least the first and second rigid plate is metalized for RFID protection.

10. The compact utility wallet of claim 7, wherein one of the tools comprises a screwdriver.

11. The compact utility wallet of claim 7, wherein one of the tools comprises a knife.

12. The compact utility wallet of claim 7, wherein one of the tools comprises a corkscrew.

13. The compact utility wallet of claim 7, wherein one of the tools comprises a pair of scissors.

14. The compact utility wallet of claim 7, wherein one of the tools comprises a file.

15. The compact utility wallet of claim 7, wherein one of the tools comprises a fishhook remover.

16. The compact utility wallet of claim 7, wherein one of the tools comprises a saw.

17. The compact utility wallet of claim 7, wherein one of the tools comprises a can opener.

18. The compact utility wallet of claim 7, wherein one of the tools comprises a bottle opener.

* * * * *